Dec. 29, 1942.   C. LIVINGSTON   2,306,482
TOOTHBRUSH
Filed March 21, 1939
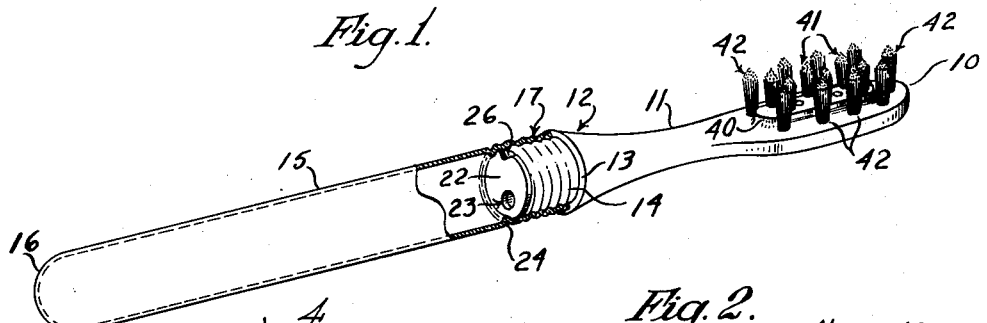
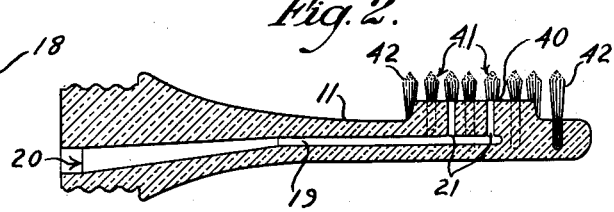
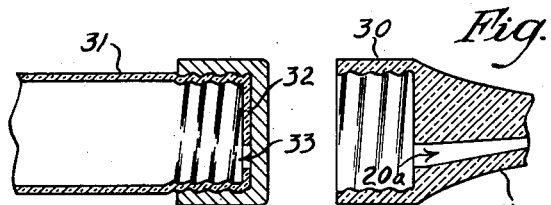
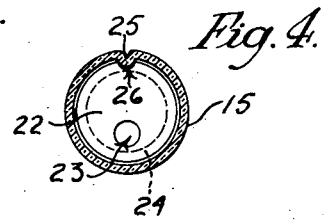
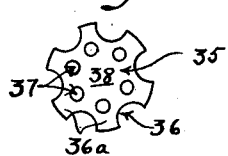
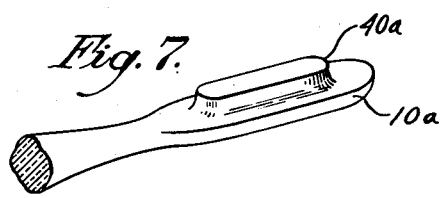
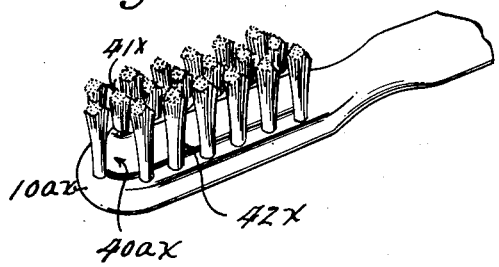
INVENTOR.

Patented Dec. 29, 1942

2,306,482

UNITED STATES PATENT OFFICE 2,306,482

TOOTHBRUSH

Callard Livingston, Chicago, Ill.

Application March 21, 1939, Serial No. 263,180

5 Claims. (Cl. 15—138)

This invention has for its principal object the provision of improvements in a brush for the teeth, said improvements relating to the provision of a combination reservoir and handle for the brush, the reservoir being adapted to contain a fluid dentifrice.

Another object is the provision of means coacting with the reservoir and brush to turn the flow of dentifrice on and off by turning the brush relative to the handle.

Another object is the provision of an elongated container shaped to form a handle for the brush and adapted to be sold separately from the brush as a renewal unit which may be thrown away when empty; the container being equipped with special valve means for controlling the flow of dentifrice into the head of the brush when the latter is attached to the handle.

Yet another object is the formation of the brush itself so that there will be relatively stiff and soft bristles to increase the cleansing and hygienic qualities thereof without necessitating the employment of more than one type of bristle.

Other objects, advantages, and economies peculiar to the invention will appear as the following description proceeds in view of the annexed drawing in which:

Fig. 1 is a perspective view of the handle container and brush in assembled relation;

Fig. 2 is a longitudinal section through the brush unit;

Fig. 3 is a fragmentary section through the container handle showing the valve means and commercial sealing cap thereon;

Fig. 4 is a cross section through the container handle just behind the valve means as seen in the direction of lines 4—4 of Fig. 3;

Fig. 5 is a fragmentary section through a modified form of coupling for the brush stem or unit;

Fig. 6 is a fragmentary section through a modified form of valve means moulded into the container handle;

Fig. 7 is a perspective fragment of a blank brush head;

Fig. 8 is a plan view of a modified form of valve washer.

Fig. 9 is a perspective fragment of the brush head including bristles as set in a head structure like that of Fig. 7.

In the embodiment shown in Fig. 1, the brush unit consists of a head portion 10 and an integral stem 11 of suitable contour and which terminates in a coupling portion 12 including an integrally formed shoulder 13 and an adjoining part with a screw threading 14 thereon. The main handle is formed by a tubular container 15 closed at its outer end 16 but open at its opposite end, the latter end being provided with screw threading 17 which is completementary to the threading 14 so that the brush unit may be threaded into the handle, provided the commercial closure cap 18 (Fig. 3) is first removed.

The container handle 15 is preferable constructed by moulding from any of the several plastics now available and in common use. This container is initially filled with a liquid dentifrice and supplied with the cap means 18 for commercial distribution apart from the brush, if desired. The container is also initially equipped with valve means for cooperation with the brush when the latter is ultimately applied thereto.

The liquid dentrifrice is fed into the brush unit through a feed channel 19 (Fig. 2) leading from a widened mouth 20 in the coupling part through the stem part 11 and the brush head 10. Smaller feed channels 21 communicate from the main channel into the head at the base region of the bristles, and the liquid dentifrice is easily ejected into the bristles by tilting the brush head down and gently shaking the assembly once or twice, depending upon the amount required.

In order to shut off the flow of liquid from the handle part, a simple valve means is provided in the form of a washer 22 having an eccentric hole 23 formed therein, the washer fitting into the mouth of the handle tube and resting upon a shoulder 24 (see Figs. 3 and 4 also) formed at the end of the threading 17. The washer is prevented from turning in the tube by opposite inward pinches 25 in the wall of the tubing just above the shoulder and which project into notches 26 punched in the edge of the washers. Only one pinch and notch is shown in the illustration, more being employed if desired.

When the handle part is screwed up tight against the shoulder 13, the eccentric hole 23 in the washer valve is out of alignment with the mouth 20 of the main channel 19, the mouth part 20 also being disposed eccentrically in the end of the coupling part, and the unapertured part of the washer bearing against the mouth 20 to close off the latter and prevent any liquid from entering the brush stem. In order to open this valve means, a partial turn is given the handle to align the eccentric openings 20 and 23 to permit liquid flow. When the container is empty, the inexpensive plastic container may be thrown away and a full one purchased and substituted therefor. The relative positions of the holes 20 and 23, when aligned, is shown in the complementary views of Figs. 2 and 3.

In the modified brush of Fig. 5, the stem part 11a terminates in an interiorly threaded female coupling 30 which threads onto instead of into the handle, the mouth 20a of the channel being eccentrically disposed for cooperation with a valve washer as heretofore described.

In the modified container 31 of Fig. 6, the mouth of the tube is provided with an integral end wall 32 in which is formed an eccentric valve opening 33 adapted to register with the mouth 20a. The end wall 32 may be "fluxed on" with a plastic solvent adhesive.

The valve means shown in Fig. 8 is in the form of a disc having semi-circular scallops or notches 36 punched around its edge with a plurality of holes 37 arranged about the center as close as possible to the scalloped edge so as to leave an appreciably expansive central blocking part 38 which confronts a central feed opening similar to the openings 20 and 20a except that it is concentrically instead of eccentrically situated in the end of the coupling part. The washer 35 rests against the shoulder formation 24, or, more particularly, the intervening body portions 36a between the scallops 36 rest on the shoulder, and when the coupling end of the brush is tightly drawn up or threaded-in in the handle tube, the central blocking part 38 confronts the centrally located entrance to the feed channel and prevents flow of the liquid therein. By loosening the coupling the flow easily and quickly works through the scalloped edge parts and holes 37 into the unobstructed mouth of the channel.

As depicted particularly in Fig. 2, the head of the brush is of especial construction in that there is a centrally situated raised part or land 40 which permits substantially wide feed ducts or holes 21 to be formed therein without weakening the foundation for the bristles, thus a larger number of feed ducts may be employed, or the size of these holes may be larger where the dentifrice has a somewhat tacky viscosity and will not flow as readily through a smaller opening.

Another advantage of the arrangement of the land resides in the fact that the bristles may be deeply seated therein to render them less flexible so that they will have a stiffer scrubbing action. The sets of bristles 41 which are secured in the land 40 are surrounded by an outer ring of bristles 42 which are relatively longer than those seated in the land and hence are more flexible than the inner sets of bristles, the advantage being that the inner bristles may be sufficiently stiff for vigorous scrubbing, while the outer bristles will be comparatively soft and not injurious to the gums as the brush is worked close along the margins thereof.

The relative seating depths are properly illustrated in Fig. 2, whereas in Fig. 1 the bristles are shown in exaggerated spacing to permit the land to be viewed. A blank brush head 10a with an integrally formed blank land 40a is shown in Fig. 7 to give a full perspective of this structure. In Fig. 9 is shown a brush head 10ax of the type shown in Fig. 7, but which includes bristles 41x in the ridge or land 40ax, and surrounding bristles 42x.

The objects and advantages of the invention may be realized in other forms of construction than that described in specific detail herein for purposes of illustration, and such details are not to be construed as limitations except as may be provided in the appended claims.

Having thus described and explained my invention, what I claim and desire to protect by Letters Patent of the United States is:

1. A toothbrush including a brush head having a raised part spaced inwardly from the marginal edges thereof, bristles of a given length set in said raised part, and a group of bristles of the same length surrounding said raised part and set in the head in the space between said raised part and said marginal edges so as to stand at approximately the same brushing level as the bristles in the raised part, said bristles being selected of stock having approximately the same stiffness per unit length.

2. In a toothbrush, a brush head having a raised body part spaced inwardly of the marginal edges of the head, bristles set in said raised part, and other bristles on opposite sides of said raised part and set in the head in the space between said raised part and said marginal edges and of an average length substantially approximating the length of the bristles in said raised part, said bristles in the raised part being set at a depth providing a shorter exposed length than that of said other bristles.

3. A brush including a brush head having bristles set therein at different depths, certain of said bristles being rendered effectively stiffer than others by being set at a depth to provide an exposed length which is shorter than that of certain other bristles, said bristles being all of approximately the same degree of stiffness per unit length of stock.

4. A toothbrush including a brush portion having relatively stiff central bristles for scrubbing and relatively softer bristles surrounding the central bristles for engagement with the gums and gum margins, said brush portion including a brush head cast in one piece with bristles all of the same length, substantially, molded in said head, portions of said head within the group of bristles being extended higher up about centrally situated bristles than about other bristles surrounding said centrally situated bristles whereby the latter will be rendered of shorter effective length than said surrounding bristles, all of said bristles being of approximately the same relative degree of stiffness per unit length.

5. In the art of brushes, the method of making a brush having localized bristle portions which are relatively stiffer than adjoining bristle portions, which method comprises the molding or setting of bristles of substantially the same length, approximate diameter or thickness, and substantially the same degree of relative stiffness per unit length, in a base member in such manner that the bristles stand at the same relative height with respect to said base member, and forming a part of said base member to extend upwardly from the latter about a desired number or portion of the bristles so as to leave relatively shorter or lesser lengths of said last-mentioned bristles exposed whereby in effect to cause said last-mentioned bristles to be stiffer than the other bristles.

CALLARD LIVINGSTON.